United States Patent
Fida

(10) Patent No.: US 10,054,203 B2
(45) Date of Patent: Aug. 21, 2018

(54) ROTATIONAL INERTERS

(71) Applicant: Toyota Motor Engineering & Manufacturing North America, Inc., Erlanger, KY (US)

(72) Inventor: Andrew E. Fida, Sun City, AZ (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/343,952

(22) Filed: Nov. 4, 2016

(65) Prior Publication Data

US 2018/0128359 A1    May 10, 2018

(51) Int. Cl.
| | |
|---|---|
| *B62D 1/16* | (2006.01) |
| *F16H 33/02* | (2006.01) |
| *F16H 1/16* | (2006.01) |
| *B60G 7/00* | (2006.01) |

(Continued)

(52) U.S. Cl.
CPC .............. *F16H 33/02* (2013.01); *B60G 7/006* (2013.01); *B62D 1/16* (2013.01); *B62K 25/005* (2013.01); *E05F 13/00* (2013.01); *F16H 1/16* (2013.01); *E05Y 2900/531* (2013.01); *E05Y 2900/548* (2013.01)

(58) Field of Classification Search
CPC . F16H 33/02; F16H 1/16; E05F 13/00; B60G 7/006; B62D 1/16; B62K 25/005; E05Y 2900/548; E05Y 2900/531

See application file for complete search history.

(56) References Cited

U.S. PATENT DOCUMENTS

| | | | | |
|---|---|---|---|---|
| 5,203,114 A | * | 4/1993 | Orlando | .................. E05C 17/30 16/82 |
| 7,931,281 B2 | | 4/2011 | Maeda et al. | |
| 9,334,914 B2 | | 5/2016 | Gartner | |

(Continued)

FOREIGN PATENT DOCUMENTS

| | | |
|---|---|---|
| WO | 2003005142 A1 | 1/2003 |
| WO | 2011089373 A1 | 7/2011 |
| WO | 2013014465 A1 | 1/2013 |

OTHER PUBLICATIONS

Chen, M., et al., "The Missing Mechanical Circuit Element", IEEE Circuits and Systems Magazine, First Quarter 2009, 17 pages.

(Continued)

*Primary Examiner* — Drew J Brown
(74) *Attorney, Agent, or Firm* — Christopher G. Darrow; Darrow Mustafa PC

(57) ABSTRACT

Rotational inerters are described herein that can provide torque applications in response to a rotation component. The inerter can include a first shaft having a first longitudinal axis and a second shaft having a second longitudinal axis. A first gear can be connected with the first shaft and a second gear can be connected with the second shaft. The first and second gears can be in meshing engagement with one another. In some arrangements, the first gear can be a worm gear and the second gear can be a worm. A flywheel can be connected with the second shaft. Rotation of the first shaft can cause the second shaft to rotate. Arrangements described herein can cause a torque to be applied at the first shaft that is proportional to a rate of change of the angular velocity of the first shaft about the first longitudinal axis.

20 Claims, 6 Drawing Sheets

(51) Int. Cl.
*B62K 25/00* (2006.01)
*E05F 13/00* (2006.01)

(56) References Cited

U.S. PATENT DOCUMENTS

| | | |
|---|---|---|
| 2009/0108510 A1 | 4/2009 | Wang et al. |
| 2009/0139225 A1 | 6/2009 | Wang et al. |
| 2013/0032442 A1 | 2/2013 | Tuluie |
| 2013/0190955 A1* | 7/2013 | Halwes .................... B60K 6/36 701/22 |
| 2014/0156143 A1* | 6/2014 | Evangelou ......... B60G 17/0157 701/37 |
| 2014/0246820 A1* | 9/2014 | Chen ....................... F16F 15/02 267/140.11 |

OTHER PUBLICATIONS

Evangelou, S., et al., "Control of Motorcycle Steering Instabilities," IEEE Cobtrol Systems Magazine, Oct. 2006, 11 pages.

\* cited by examiner

ROTATIONAL INERTERS

FIELD

The subject matter described herein relates in general to inerters and, more particularly, to inerters receiving a rotational input.

BACKGROUND

Inerters represent two-terminal devices in mechanical networks in which forces applied at the two terminals are equal, opposite, and proportional to a relative acceleration between the terminals. In the study of mechanical networks, the inerter can represent as the mechanical equivalent of a capacitor of an electrical network. Inerters have been used to control forces of a linear input relative to a fixed second terminal. Such linear inerters have incorporated rack-and-pinion, ball screw, and hydraulic designs.

SUMMARY

In one respect, the present disclosure is directed to a rotational inerter system. The system includes a first shaft having a first longitudinal axis. The system further includes a first gear operatively connected to the first shaft, where the first shaft and the first gear are rotatable about the first longitudinal axis. The system includes a second shaft having a second longitudinal axis. The system includes a second gear operatively connected to the second shaft, where the second gear is in meshing engagement with the first gear, and the second shaft and the second gear are rotatable about the second longitudinal axis. A flywheel is operatively connected to the second shaft. Rotation of the first shaft causes rotation of the second shaft and the flywheel about the second longitudinal axis. The first and second longitudinal axes stay in fixed relation to one another during rotation of the first shaft. A torque is applied at the first shaft, the torque is proportional to a rate of change of the angular velocity of the first shaft about the first longitudinal axis.

In another respect, the present disclosure is directed to a vehicle system having a rotational inerter. The system includes a first vehicle component configured to rotate relative to a second vehicle component. The system also includes an inerter. The inerter includes a first shaft having a first longitudinal axis, where the first shaft is operatively connected to the first vehicle component. The inerter further includes a first gear operatively connected to the first shaft, where the first shaft and the first gear are rotatable about the first longitudinal axis. The inerter includes a second shaft having a second longitudinal axis, and the second shaft is operatively connected to the second vehicle component. The inerter includes a second gear operatively connected to the second shaft, where the second gear is in meshing engagement with the first gear, and the second shaft and the second gear are rotatable about the second longitudinal axis. A flywheel is operatively connected to the second shaft. Rotation of the first vehicle component causes rotation of the first shaft about the first longitudinal axis. Rotation of the first shaft causes rotation of the second shaft and the flywheel about the second longitudinal axis. The first and second longitudinal axes stay in fixed relation to one another during rotation of the first shaft. A torque is applied at the first shaft, the torque is proportional to a rate of change of the angular velocity of the first shaft about the first longitudinal axis.

In still another respect, the present disclosure is directed to a vehicle suspension system. The system includes a sway bar operatively connected to two individual wheel components, and the sway bar has a center portion having a first longitudinal axis. The system further includes a sway bar support operatively connected to the sway bar and a first vehicle structure. The sway bar is rotatable about the first longitudinal axis within the sway bar support. A worm gear is operatively connected to the center portion of the sway bar, and the worm gear is rotatable about the first longitudinal axis. The system includes a shaft having a second longitudinal axis, and the shaft is operatively connected to a second vehicle structure. A worm is operatively connected to the second shaft. The worm is in meshing engagement with the worm gear, and the second shaft and the worm are rotatable about the second longitudinal axis. Included in the system is a flywheel operatively connected to the second shaft. Rotation of the sway bar causes rotation of the worm gear about the first longitudinal axis. Rotation of the worm gear causes rotation of the second shaft and the flywheel about the second longitudinal axis at a faster angular velocity than that of the first shaft. The first and second longitudinal axes stay in fixed relation to one another during rotation of the sway bar. A torque is applied at the sway bar, the torque is proportional to a rate of change of the angular velocity of the sway bar about the first longitudinal axis.

DETAILED DESCRIPTION

Figure 1A:
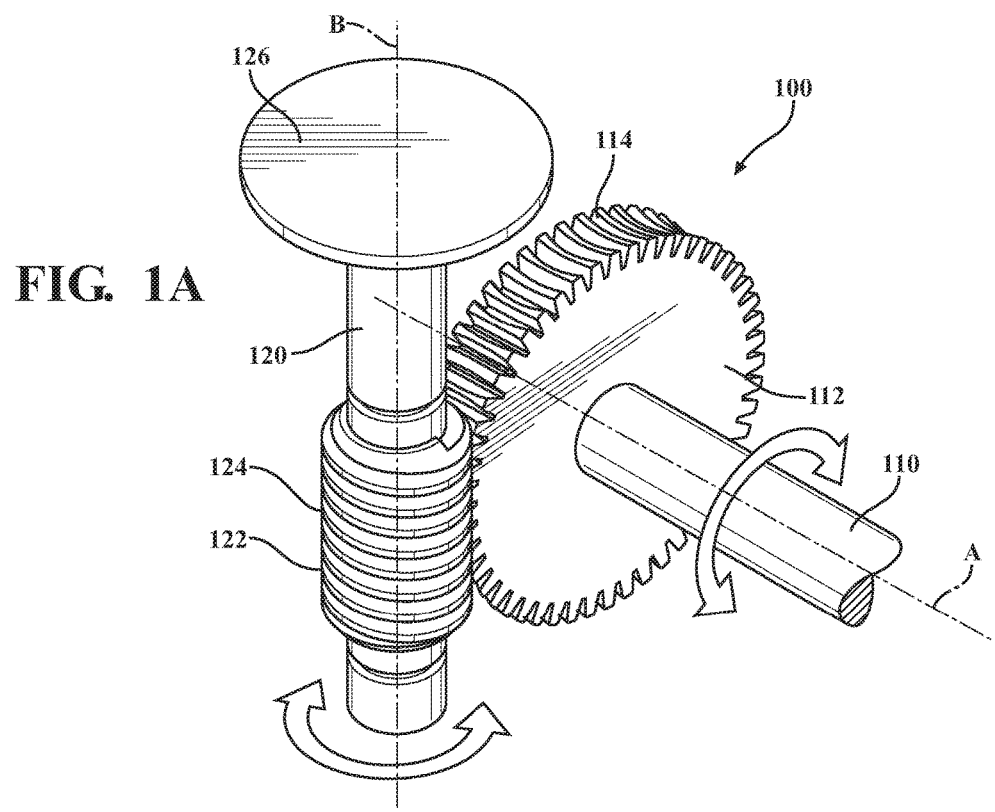
FIGS. 1A and 1B are different views of an example of a rotational inerter.

This detailed description relates to rotational inerters that can provide torque applications in response to a rotating component. The inerter can include a first shaft having a first longitudinal axis and a second shaft having a second longitudinal axis. A first gear can be connected with the first shaft and a second gear can be connected with the second shaft. The first and second gears can be in meshing engagement with one another. In some arrangements, the first gear can be a worm gear and the second gear can be a worm. A flywheel can be connected with the second shaft. Rotation of the first shaft can cause the second shaft to rotate. Arrangements described herein can cause a torque to be applied at the first shaft that is proportional to a rate of change of the angular velocity of the first shaft about the first longitudinal axis. The present detailed description relates to apparatuses and/or systems that incorporate one or more such features. In at least some instances, arrangements described herein can increase the control and response of rotating vehicle components such as suspension, steering, and/or door components.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1B:
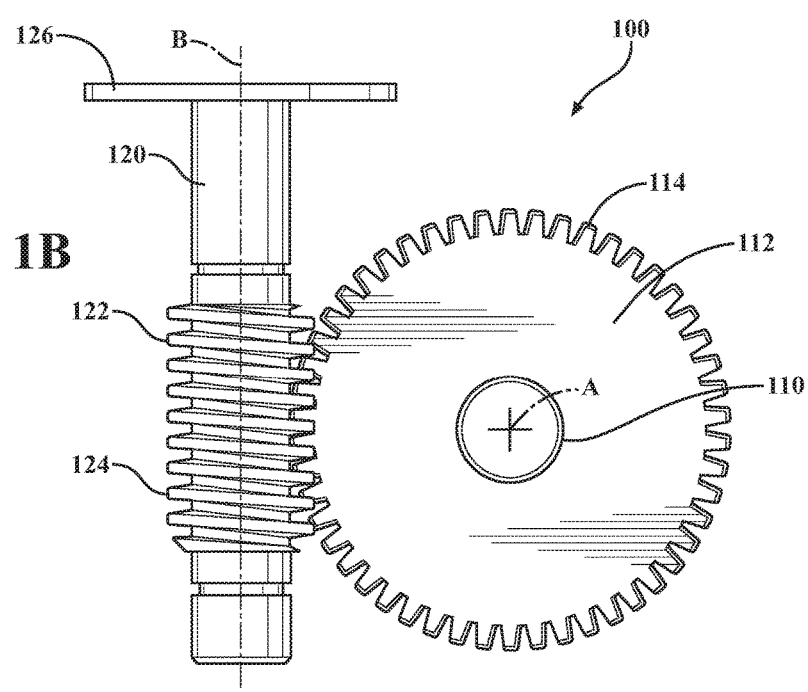

Referring to FIGS. 1A and 1B, an example of an inerter 100 is shown. The inerters described herein can apply a force that is proportional to a relative acceleration between at least two nodes. Further, for the inerters described below, the force can be in the form of a torque acting about an axis and the relative acceleration can be a relative angular acceleration. In one or more arrangements, the inerter 100 can include a first shaft 110 and a second shaft 120 mechanically linked via two or more gears. In some arrangements, the gears can include a worm gear 112 and a worm 122.

The first shaft 110 can have any suitable size, shape, and/or configuration to supply a rotational input to the inerter 100. In one or more arrangements, the first shaft 110 can be substantially cylindrical. As used herein, the term "substantially" includes exactly the term it modifies and slight variations therefrom (e.g., within normal manufacturing tolerances, within about 10 degrees or less, within about 5 degrees or less, within about 4 degrees or less, within about 3 degrees or less, within about 2 degrees or less, or within about 1 degree or less). In one or more arrangements, the first shaft 110 can include a portion that extends in a substantially straight direction along a longitudinal axis A. As described in further detail below, the first shaft 110 can be connected with, or included as a portion of, rotatable structure in a variety of specific applications.

In one or more arrangements, a first gear can be operatively connected to the first shaft 110. The term "operatively connected," as used throughout this description, can include direct or indirect connections, including connections without direct physical contact. In some arrangements, the first gear can be a worm gear 112 that is operatively connected to the first shaft 110. For example, the worm gear 112 can be operatively connected to the first shaft 110 by one or more fasteners, one or more adhesives, and/or one or more forms of mechanical engagement. Alternatively, the worm gear 112 and the first shaft 110 can be formed as a unitary structure.

The second shaft 120 can have any suitable size, shape, and/or configuration. In one or more arrangements, the second shaft 120 can be substantially cylindrical. In one or more arrangements, the second shaft 120 can include a portion that extends in a substantially straight direction along a center longitudinal axis B. The second shaft 120 can be allowed to rotate about the axis B.

In some arrangements, a second gear can be operatively connected to the second shaft 120. The first and second gears can be in meshing engagement with one another. As used herein, "meshing engagement" can include any conditions in which rotation of one gear can cause rotation of the other gear. In some arrangements, the second gear can be a worm 122. For example, the worm 122 can be operatively connected to the second shaft 120 by one or more fasteners, one or more adhesives, and/or one or more forms of mechanical engagement. Alternatively, the worm 122 and the second shaft 120 can be formed as a unitary structure.

The worm gear 112 can have any suitable size, shape, and/or configuration to engage with the worm 122. In one or more arrangements, the worm gear 112 can be configured to rotate about the axis A. As shown in FIGS. 1A and 1B, the worm gear 112 include several cut teeth 114.

The worm 122 can have any suitable size, shape, and/or configuration to engage the worm gear 112. In one or more arrangements, the worm 122 is a gear with one or more cylindrical, screw-like threads 124. The threads 124 can be in any suitable configuration known to those skilled in the art. For example, the threads 124 of the worm 122 can include a single thread, a double thread, a triple thread, or a quadruple thread.

It is to be appreciated that the worm gear 112 and/or the worm 122 can be configured to provide desired interaction between the two components. For instance, the teeth 114 of the worm gear 112 can be configured to engage the thread 124 of the worm 122. The inerter 100 can include a non-throated worm gear 112 and worm 122. Alternatively, the worm gear 112 and/or the worm 122 can be throated. Similarly, each of the worm gear 112 and/or the worm 122 can be sized to achieve desired characteristics. In one or more arrangements, the worm gear 112 and the worm 122 can be left or right handed.

In one or more arrangements, the worm gear 112 and the worm 122 can have any suitable gear ratio. "Gear ratio" as used herein can represent the number of teeth 114 on the worm gear 112 per number of threads 124 on the worm 122. The gear ratio can determine how much the second shaft 120 rotates based on a given rotation for the first shaft 110. As one non-limiting example, the gear ratio between the worm gear 112 and the worm 122 can be 50:1. This can correspond to a worm gear 112 having 50 teeth 114 and a worm 122 having a single thread 124. Further, in such an example, the worm 122 can be rotated at an angular velocity an amount 50 times greater than an angular velocity of the worm gear 112 in such a setup. In one or more arrangements, the worm gear 112 and worm 122 can provide a high gear ratio without the need for large and/or three or more gears.

In one or more arrangements, the worm gear 112 and the worm 122 can be configured to allow back drive in the system. As used herein, "back drive" includes any condition in which rotation of the worm gear 112 and the worm 122 can be reversed after the worm gear 112 and the worm 122 are rotated in a first direction. For example, the first shaft 110 and the worm gear 112 can be rotated about the axis A in a first direction (e.g., clockwise) upon an input torque. The second shaft 120 and the worm 122 can be rotated about the axis B in a first direction. After removal of the input torque and/or after a new torque is applied, rotation can occur in the second shaft 120 and the worm 122 in a second direction about the axis B, opposite from the first direction. Similarly, the first shaft 110 and the worm gear 112 can be rotated in a second direction (e.g., counterclockwise) about the axis A, opposite from the first direction. In some arrangements, the inerter can allow back drive based on a friction present between the worm gear 112 and the worm 122. In some instances, friction can be based on the gear ratio of the system as well as a worm lead angle. As one non-limiting example, back driving can occur if the gear ratio is below 50:1 and the worm lead angle is greater than 5 degrees.

In one or more arrangements, lubrication can be used within the inerter 100. For example, a lubricant can be present between the worm gear 112 and the worm 122. The lubricant can reduce friction between portions of the worm gear 112 and the worm 122 that contact one another. In some arrangements, the lubricant can include compounded mineral oils, extreme pressure (EP) mineral gear oils, and synthetics.

In one or more arrangements, a flywheel 126 can be operatively connected to the second shaft 120. For example, the flywheel 126 can be operatively connected to the second shaft 120 by one or more fasteners, one or more adhesives, and/or one or more forms of mechanical engagement. Alternatively, the flywheel 126 and the second shaft 120 can be formed as a unitary structure. As used herein, "flywheel" includes any mass capable of adding rotational inertia about an axis of rotation for the second shaft 120. For instance, the flywheel 126 can provide rotational inertia about the axis B.

The flywheel 126 can have any suitable size, shape, and/or configuration to provide rotational inertia about the axis B. In one or more arrangements, the flywheel 126 can be substantially cylindrical. It is to be appreciated that other sizes, shapes, and/or configurations of the flywheel 126 can be used. For instance, the flywheel 126 can include prisms having polygonal bases. In one or more arrangements, the flywheel can by substantially symmetrical about axis B as shown in the Figures. In some arrangements, the flywheel 126 can be the second shaft 120 and/or the worm 122. For example, the mass and configuration of the second shaft 120 and/or the worm 122 can provide desired rotational inertia for the inerter 100.

In one or more arrangements, the inerter 100 can be configured to allow the flywheel 126 to be applied in a single rotational direction. For instance, the inerter 100 can include a one-way clutch to allow the flywheel 126 to be applied in one rotational direction of the second shaft 120. The clutch can selectively engage and/or disengage to cause the flywheel 126 to be operatively connected and/or disconnected from the second shaft 120. In some arrangements, the clutch can cause forces to be applied to the first shaft 110 that are proportional to the change in angular velocity in a single direction of rotation of the first shaft 110.

In one or more arrangements, a frictional force can be applied to the second shaft 120. In some arrangements, the frictional force can be passive force, such as a friction between the second shaft 120 and one or more supports, such as a bearing. Alternatively or in addition, the frictional force can be an active force. In some arrangements, the active force can be produced by applying a contact force to the flywheel 126 and/or the second shaft 120. For example, the contact force can include a brake caliper contacting one or more surfaces of the flywheel 126. In some arrangements, the brake caliper can be controlled by one or more vehicle components, such as one or more controllers.

In one or more arrangements, portions of the inerter 100 can be dampened using a fluid. For instance, a fluid can be used as a viscous damper through contact of the fluid and the flywheel 126. In some arrangements, the viscous damper can be a passive force, such as a lubricant in constant contact with portions of the flywheel 126. Alternatively or in addition, the viscous damper can be an active force, wherein the presence, pressure, and/or any other characteristic of the lubricant can be changed over time.

In one or more arrangements, a housing (not shown) can be used to retain, position, shield, and/or protect components of the inerter 100. For instance, a housing can extend substantially around the worm gear 112 and the worm 122 to retain a lubricant and protect the worm gear 112 and the worm 122.

The functionality of the inerter 100 can now be further described. The inerter 100 can provide a torque that is proportional to a rate of change of a relative angular velocity between two terminals. For example, the torque (T) can be expressed as:

$$T = B\frac{d\omega}{dt},$$

wherein $\omega = \omega 1 - \omega 2$. In one or more arrangements, $\omega 1$ can be the angular velocity at the first terminal and $\omega 2$ the angular velocity at the second terminal. B is the inerter coefficient and can represent the inertance of the inerter 100.

In some arrangements, B can be expressed as: $B = J\alpha^2$, wherein J is the moment of inertia (also known as the angular mass or rotational inertia) of a rotating mass and $\alpha$ is the amount of rotation of the rotating mass measured in radians. In one or more arrangements, the moment of inertia can be expressed as: $J = mk^2$, wherein m is a point mass and k is a radius of gyration. The point mass and the radius of gyration can be used to give an equivalent inertia to different shaped structures. Thus, in some arrangements, torque applied by the inerter 100 can be expressed as:

$$T = (m(\alpha k)^2)\frac{d\omega}{dt}.$$

In one or more arrangements, the angular velocity at the second terminal can estimated to be zero. For instance, the second terminal can be stationary within a fixed system. In such arrangements, $\omega$ is the angular velocity of the first terminal, and $$\frac{d\omega}{dt}$$

becomes the angular acceleration of the first terminal. In one or more arrangements, the first shaft 110 can be the first terminal and a fixed housing and mounting of the inerter 100 can act as a stationary second terminal.

In some arrangements, the first shaft 110 can be rotated about axis A as a result of the input torque. As described below, the input torque can result from a variety of applications. The rotation can be transferred through the worm gear 112 to the worm 122, rotating the second shaft 120. The second shaft 120, along with the flywheel 126, can be rotated about the axis B. The second shaft 120 and the flywheel 126 can add inertia such that a force is applied back to the first shaft 110. For example, a torque can be produced that is in an opposite direction from the input torque and proportional to the change of angular velocity of the first shaft 110.

Non-limiting examples of applications for the inerter 100 will now be presented. In some arrangements, the inerter 100 can be used in connection with a vehicle. As used herein, "vehicle" means any form of powered transport. For instance, the vehicle can be an automobile or motorcycle. In some implementations, the vehicle may be a watercraft, an aircraft, a spacecraft, or any other form of transport.

Figure 2A:
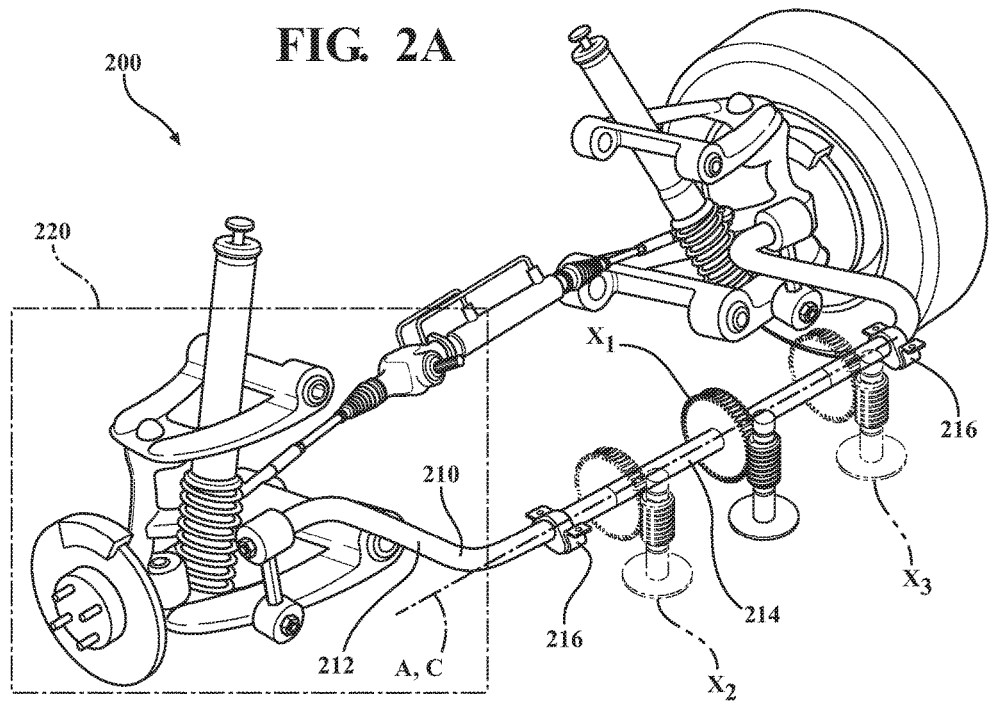
FIGS. 2A and 2B are views showing the example rotational inerter of FIGS. 1A and 1B in a vehicle sway bar application.
Figure 2B:
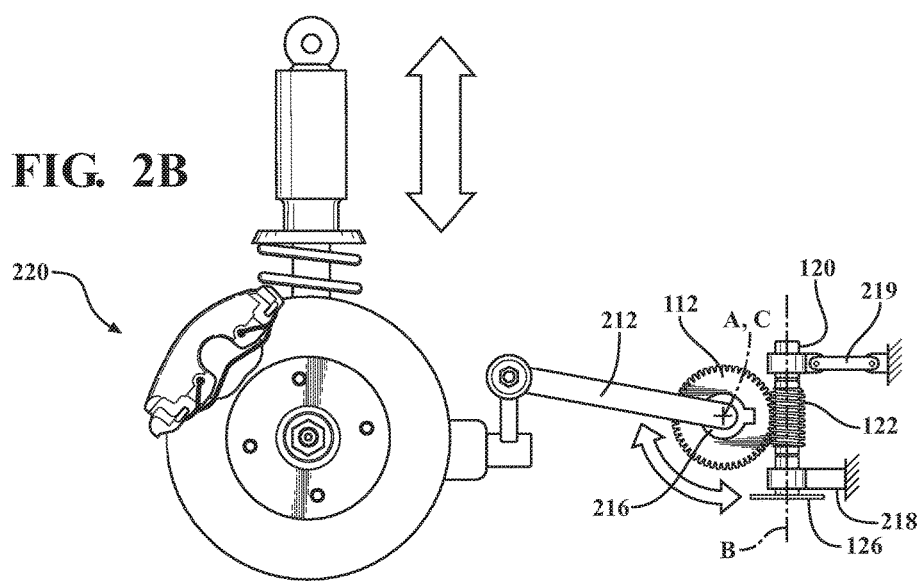
Figure 3A:
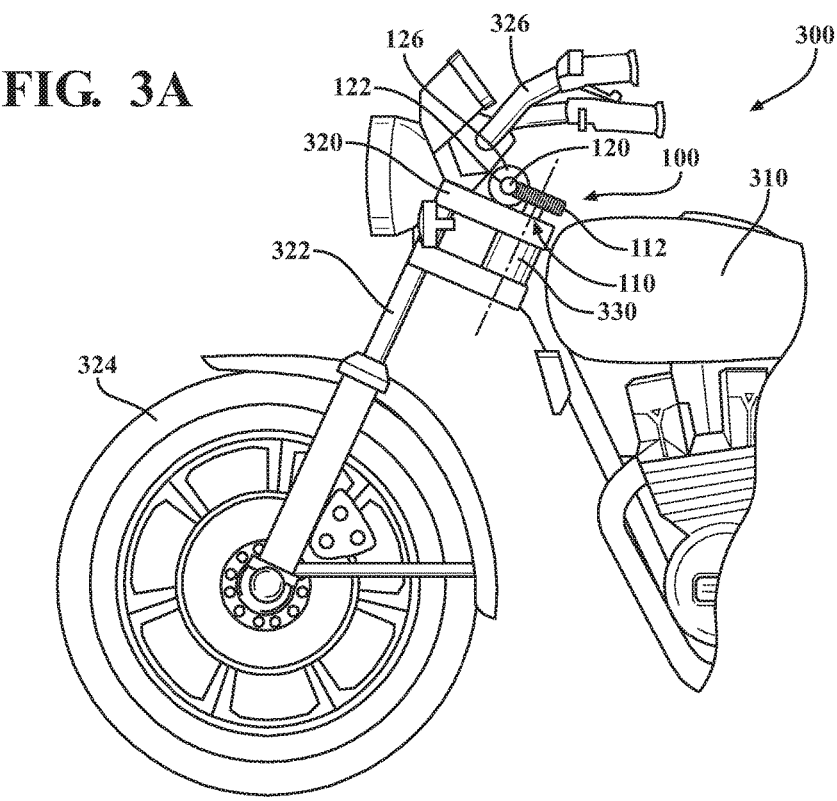
FIGS. 3A and 3B are views showing the example rotational inerter of FIGS. 1A and 1B in a first vehicle steering application.
Figure 3B:
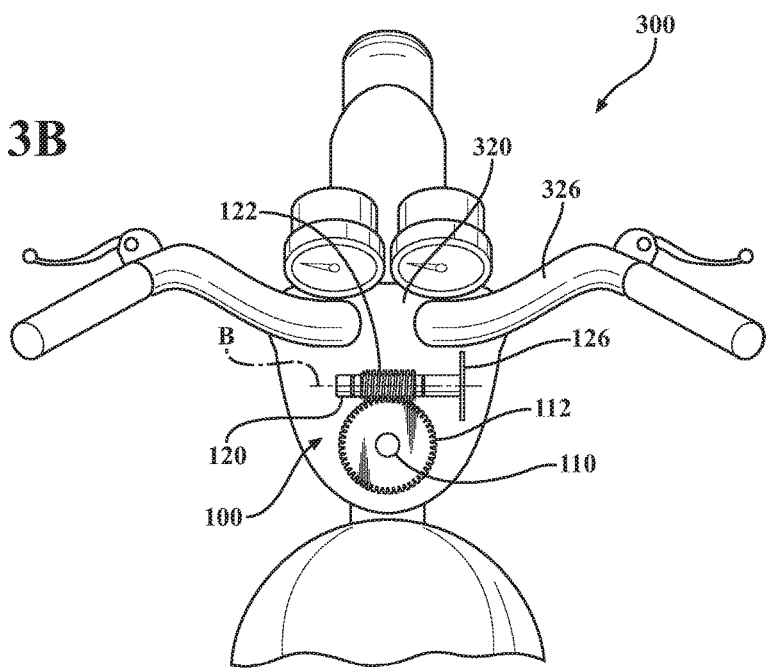

In one or more arrangements, the inerter 100 can be utilized within a vehicle suspension system 200 as shown in FIGS. 2A and 2B. As shown in FIG. 2A, the suspension system 200 can include individual wheel components 220 linked together by a sway bar 210. The sway bar (also called anti-sway bar, stabilizer bar, or anti-roll bar) 210 can include lever arms 212a and 212b that connect to the individual wheel components 220. Further, the sway bar 210 can include a center portion 214 located between the lever arms 212a and 212b. In one or more arrangements, at least a portion of the center portion 214 can extend in a substantially straight direction. For example, the center portion 214 can extend along an axis C as shown in FIG. 2A. The sway bar 210 can be retained by one or more mounts 216. In one or more arrangements, the sway bar 210 can rotate within the mounts 216. For example, the sway bar 210 can rotate about the axis C.

In one or more arrangements, the sway bar 210 can be configured to rotate about the mounts 216 in the event of one or more of the individual wheel components 220 move relative to other portions of the vehicle. For example, when both individual wheel components 220 of the example vehicle suspension 200 move upward (e.g., the vehicle goes over a bump), the sway bar 210 can rotate about the axis C. When one individual wheel component 220 moves upward, or both move upward different amounts, the sway bar 210 can be subject to torsion and subject to twist. During a twisting condition, portions of the sway bar 210 can rotate about the axis C by different amounts. For example, one end of the center portion 214 may rotate about the axis C by a different amount than an opposite end of the center portion 214.

In one or more arrangements, movement of the sway bar 210 can provide an input torque to the inerter 100. In one or more arrangements, the first shaft 110 can be operatively connected to, or be, a portion of the sway bar 210. For example, the first shaft 110 can be a portion of the center portion 214 of the sway bar 210. In some arrangements, the worm gear 112 can be operatively connected directly to the center portion 214. As shown in both FIGS. 2A and 2B, the axis A of the first shaft 110 can be the same as the axis C of the center portion 214. Accordingly, in such arrangements, the rotation of the sway bar 210 provides the rotation of the first shaft 110.

The second shaft 120 can be positioned near the sway bar 210 and operatively connected to other vehicle structure. For instance, the second shaft 120 can be operatively connected via one or more mounts 218. The mounts 218 can be operatively connected to any suitable vehicle structure that does not substantially rotate along with the sway bar 210. For example, the vehicle structure can be a vehicle frame member or other suspension component. In some arrangements, the mounts 218 can allow the second shaft 120 to rotate about the axis B. For example, the mounts 218 can include one or more bearings.

In one or more arrangements, the second shaft 120 can be operatively connected with one or more reaction link(s) 219. The reaction link(s) 219 can allow the worm 122 to stay in proper contact with the worm gear 112 if the sway bar 210 moves within the mounts 216. For instance, if the axes A, C move in a direction towards or away from the axis B, the reaction link(s) 219 can adjust the position of the second shaft 120 accordingly. In one or more arrangements, the reaction link(s) 219 can extend or shorten itself to reposition the second shaft 120. The reaction link(s) 219 can include springs or other biasing members to bias the second shaft 120 towards a particular position. For example, the reaction link(s) 219 can bias the worm 122 towards the worm gear 112.

The inerter 100 can be positioned along the sway bar 210 in any suitable position. In one or more arrangements, the inerter 100 can be located at position X1 as shown in FIG. 2A. The position X1 can be substantially centered along the center portion 214. Alternatively or in addition, the inerter 100 can be located at positions toward an end of the center portion 214 of the sway bar 210. For instance, one or more inerters 100 can be located at positions X2 and/or X3. In one or more arrangements, the positioning of the inerter(s) 100 along the sway bar 210 can affect the driving dynamics of the vehicle. For example, the sway bar 210 can rotate at position X1 during vertical movement of both individual wheel components 220. During a twisting of the sway bar 210 when one individual wheel component 220 is moved substantially more than the other, the position X1 of the center portion 214 can rotate less than positions X2 and/or X3 of the center portion 214. Accordingly, an inerter 100 positioned near X1 will be affected by vertical axle movement more than vehicle roll and/or individual wheel movements. Inerter(s) 100 positioned near positions X2 and/or X3 can be affected by both vertical axle movement as well as vehicle roll and/or individual wheel movements. While three distinct positions are shown in FIG. 2A, it is to be appreciated that one or more inerters 100 can be positioned anywhere along the sway bar 210 to provide desired suspension dynamics.

In some arrangements, the inerter 100 allows back driving during rotation of the sway bar 210. For instance, as the individual wheel components 220 move upward, the sway bar 210 can rotate a first direction (clockwise in FIG. 2B). The worm gear 112 and the worm 122 can be configured such that they allow the sway bar 210 to rotate in an opposite direction thereafter (counterclockwise in FIG. 2B). For example, during operation of the vehicle the individual wheel components 220 can move up and down as the vehicle travels along uneven roadways. The inerter 100 can provide inertance for the rotating sway bar 210 in both directions of rotation.

In one or more arrangements, the inerter 100 can be utilized in a vehicle steering system. For instance, the inerter 100 can be used in a motorcycle steering system 300 shown in FIGS. 3A and 3B. In one or more arrangements, the forces produced by the inerter 100 during turning of the front 320 can dampen high frequency vibrations during operation of the system 300, such as road induced "wobble" or "shimmy."

In one or more arrangements, the steering system 300 can include a body 310 pivotally connected to a rotatable front 320. The front 320 can include a fork 322 that is operatively connected to a wheel 324 along with handlebars 326. The front 320 can rotate relative to the body 310 about pivot 330.

The inerter 100 can be used within steering system 300 such that movement of the front 320 relative to the body 310 can provide an input torque to the inerter 100. In one or more arrangements, the first shaft 110 can be operatively connected to, or be, a portion of the pivot 330. For example, the first shaft 110 can extend through the pivot 330 and act as a hinge for the front 320 to rotate relative thereto. Accordingly, the steering axis of the system 300 can be aligned with the axis A of the first shaft 110.

The second shaft 120 can be operatively connected to the front 320 of the system 300. In one or more arrangements, the system 300 can be configured such that when the front 320 rotates about the pivot 330, the worm gear 112 rotates relative to the worm 122. Such relative rotation can provide the input torque to the first shaft 110. In one or more arrangements, the worm gear 112 and the worm 122 can allow back driving. For example, the front 320 can rotate in two opposite directions relative to the body 310.

Figure 4:
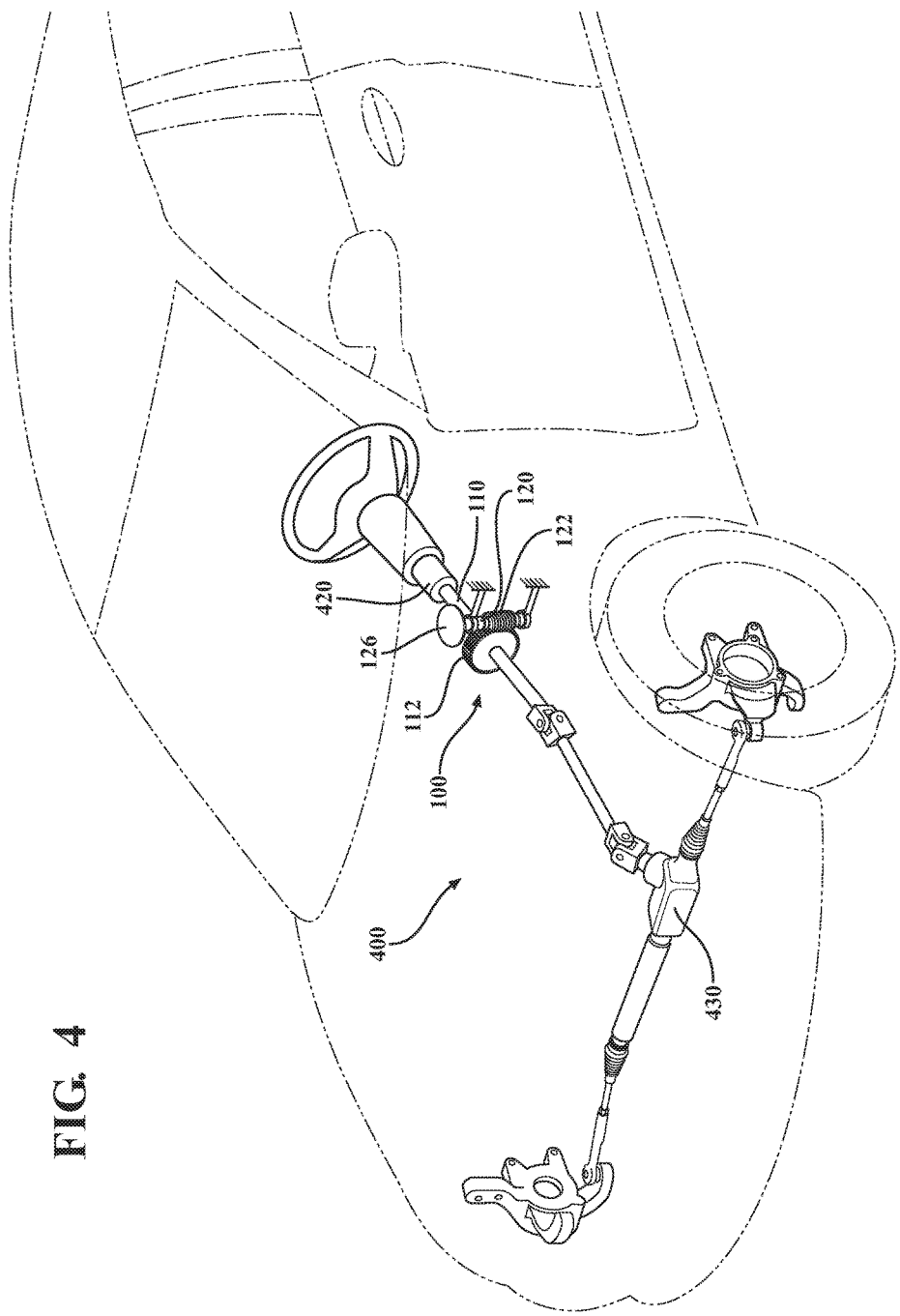
FIG. 4 shows the example rotational inerter of FIGS. 1A and 1B in a second vehicle steering application.

FIG. 4 shows the example worm gear type rotational inerter of FIGS. 1A and 1B in a second vehicle steering application. In one or more arrangements, the inerter 100 can be utilized within an automobile steering system 400. The steering system 400 can include a steering wheel 410, a steering column 420, and/or a steering linkage 430. The steering wheel 410 can receive steering input from an occupant of the vehicle. The steering wheel can cause a steering column to rotate, which can change orientation of one or more wheels of the vehicle via the steering linkage 430. In one or more arrangements, the steering linkage 430 can include a rack and pinion system, including a pinion gear turned by the steering column and a rack moved by a rotation of the pinion gear.

In one or more arrangements, one or more inerters 100 can be located near the steering column 420 and/or the steering linkage 430. For instance, the inerter 100 can be located near portions of the steering column 420 and/or the pinion of the steering linkage 430. In some arrangements, the first shaft 110 can include, or be composed of, portions of the steering column 420. For instance, the first shaft 110 can be a portion of the steering column 420 and include the worm gear 112 as shown in FIG. 4. In one or more arrangements, the second shaft 120 can be operatively connected to vehicle structure nearby the steering column 420.

In one or more arrangements, a steering input can produce an input torque to the first shaft 110. As the steering column rotates, the worm gear 112 rotates. The rotation of the worm gear 112 can be transferred through the worm 122 to the second shaft 120 and the flywheel 126. Accordingly, the inerter 100 can provide a torque proportional to the change in angular velocity of the steering column 420/first shaft 110. In one or more arrangements, the worm gear 112 and the worm 122 can allow back driving. For example, the steering column 420 rotate in two opposite directions.

Figure 5:
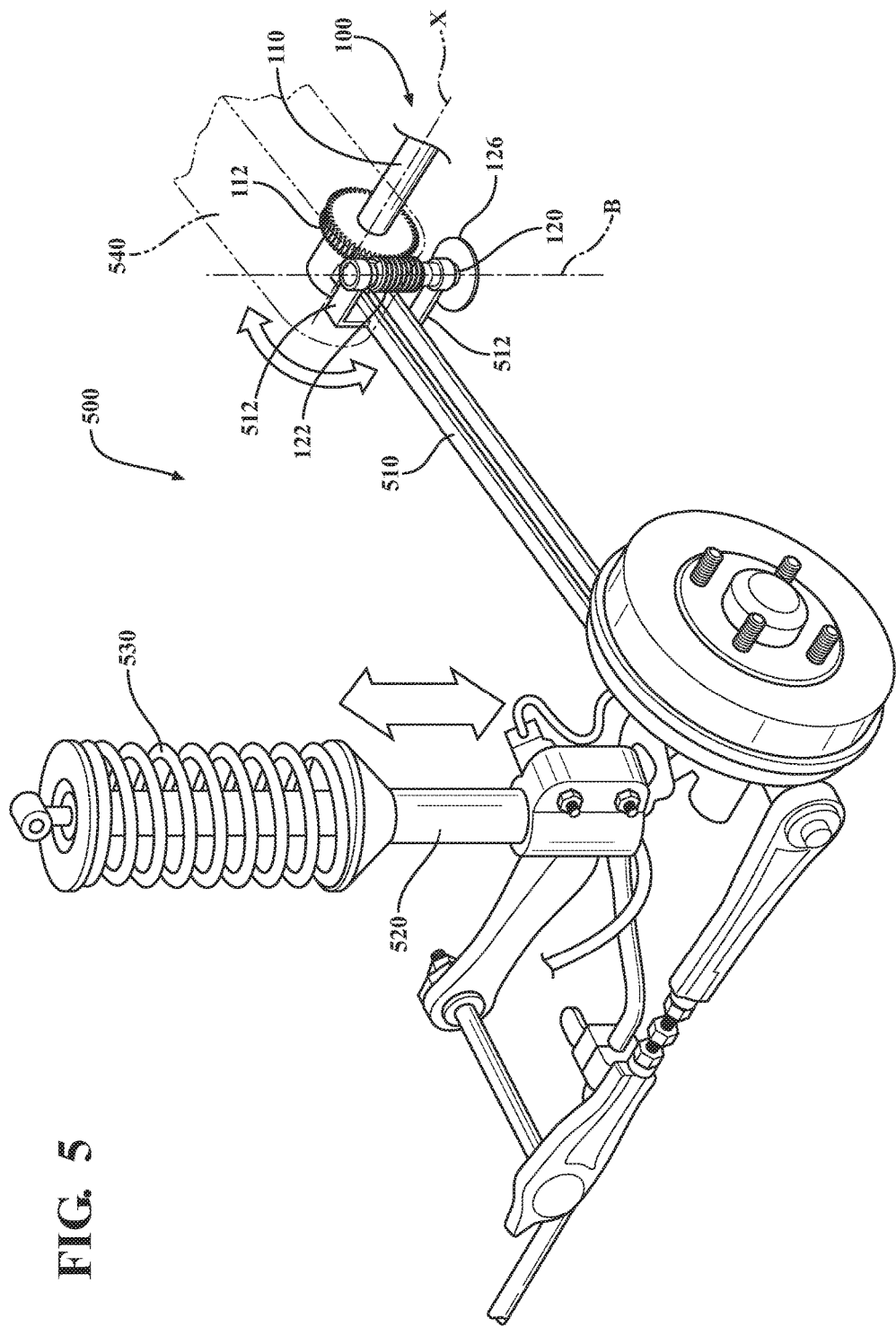
FIG. 5 shows the example rotational inerter of FIGS. 1A and 1B in a trailing arm suspension application.

In one or more arrangements, the inerter 100 can be utilized in a trailing arm type suspension for a vehicle. For example, a trailing arm (or trailing-link) suspension system 500 is shown in FIG. 5. In one or more arrangements, one or more arms 510 can be connected to a pivot 550 at a first end and a wheel portion of the vehicle at a second end. The pivot 550 can include a hinge pin that connect the arm(s) to a body component 540. In some arrangements, the arm(s) 510 can rotate about the pivot, while a damper 520 and a spring 530 can provide dampening and resistance for movement by the wheel portion in a substantially linear direction.

In one or more arrangements, the inerter 100 can be located near the pivot 550 of the trailing-arm suspension 500. For instance, the first shaft 110 can be operatively connected to, or include, the pivot 550. Further, the second shaft 120 can be operatively connected to the arm 510. For example, the second shaft 120 can be operatively connected to the arm 510 via one or more bearing mounts 512. The bearing mounts 512 can allow the second shaft 120 to be rotatable about the axis B.

In some arrangements, the rotation of the first shaft 110 and pivot 550 relative to the second shaft 120 and the arm 510 can provide an input torque to the inerter 100. Such rotation of the first shaft 110 relative to the second shaft 120 can cause the second shaft 120 and the flywheel 126 to rotate about the axis B. In one or more arrangements, the worm gear 112 and the worm 122 can allow back driving. For example, the arm 510 can rotate in two opposite directions relative to the pivot 550. In some arrangements, the arm 510 may include any suitable reinforcements related to the transmission of a bending load. For example, the arm 510 can be strengthened to receive forces from the inerter(s) 100.

Figure 6:
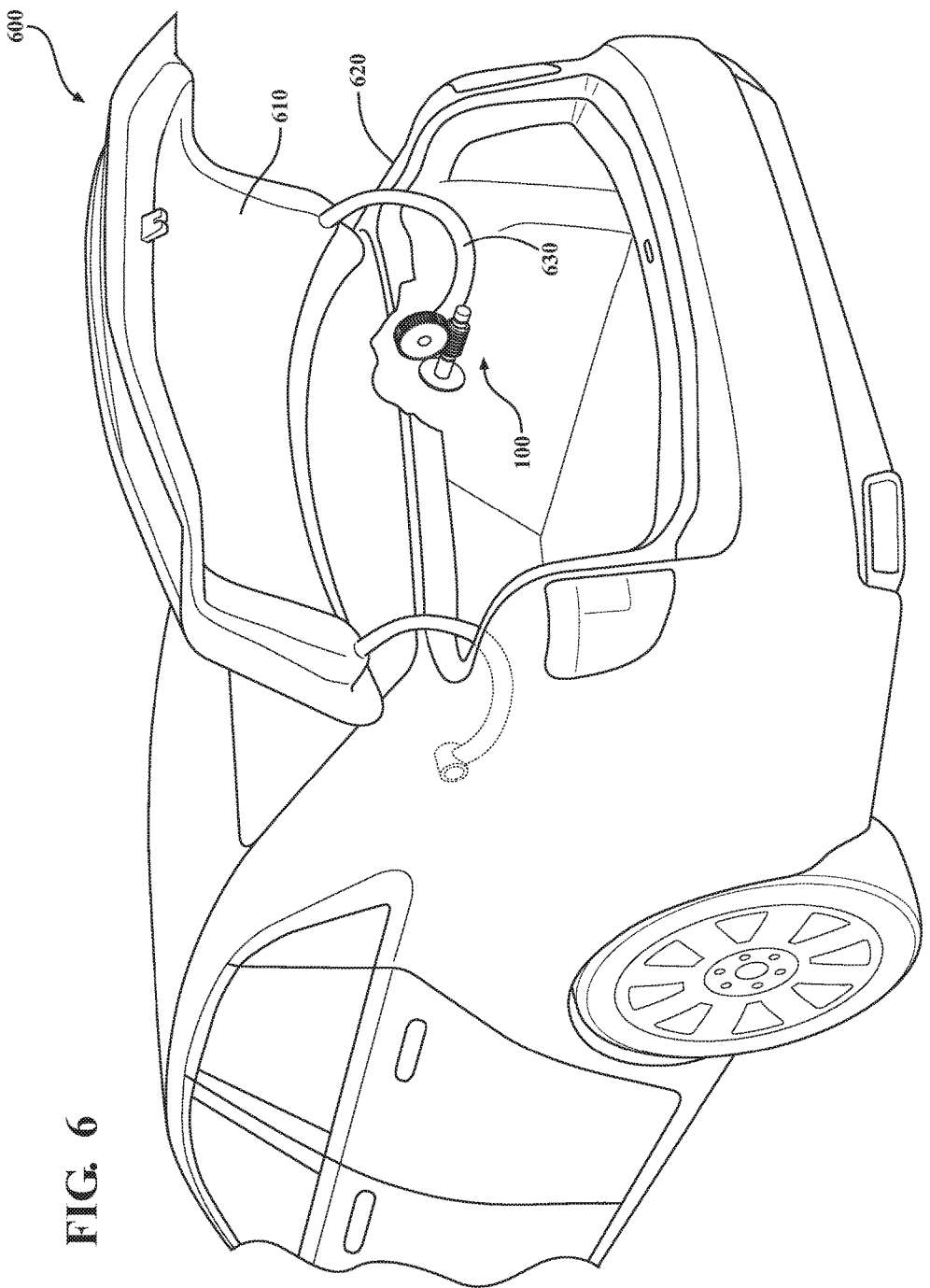
FIG. 6 shows the example rotational inerter of FIGS. 1A and 1B in a vehicle door hinge application.

In one or more arrangements, the inerter 100 can be utilized in a door hinge of a vehicle. For example, as shown in FIG. 6, the inerter 100 can be utilized in a trunk area 600 of a vehicle. The inerter 100 can be operatively connected between a trunk 610 and a vehicle body 620 at a trunk hinge 630. In some arrangements, the inerter 100 can allow for smoother movement of the trunk 610 between a closed and open position.

In one or more arrangements, the inerter 100 can be configured such that the rotational movement of the trunk 610 provides an input torque at the first shaft 110. For instance, the first shaft 110 can be operatively connected to, or include, a hinge pin of the trunk hinge 630. For example, the second shaft 120 can be operatively connected to a portion of the trunk 610 or the vehicle body 620. The first shaft 110 can include the hinge pin of the trunk hinge 630. As the trunk 610 is rotated relative to the vehicle body 620, the first shaft 110 can rotate relative to the second shaft 120. In one or more arrangements, the worm gear 112 and the worm 122 can allow back driving. For example, the trunk 610 can rotate in two opposite directions relative to the vehicle body 620 (opening and closing directions).

It will be appreciated that arrangements described herein can provide numerous benefits, including one or more of the benefits mentioned herein. For example, arrangements described herein can provide rotational inertance to rotating components. The inerters described herein can allow rotational inputs to be dampened and/or controlled. For example, the inerters can be used in vehicle suspension, steering, and/or door systems to control rotational input of one or more components.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:
1. A rotational inerter system comprising:
a first shaft having a first longitudinal axis;
a first gear operatively connected to the first shaft, the first shaft and the first gear being rotatable about the first longitudinal axis;
a second shaft having a second longitudinal axis;
a second gear operatively connected to the second shaft, the second gear being in meshing engagement with the first gear, and the second shaft and the second gear being rotatable about the second longitudinal axis; and
a flywheel operatively connected to the second shaft,
wherein rotation of the first shaft about the first longitudinal axis causes rotation of the second shaft and the flywheel about the second longitudinal axis, wherein the first and second longitudinal axes stay in fixed relation to one another during rotation of the first shaft, and wherein during the rotation of the first shaft, a torque is applied at the first shaft, the torque being proportional to a rate of change of an angular velocity of the first shaft about the first longitudinal axis, wherein the first gear is a worm gear and the second gear is a worm.

2. The system of claim 1, wherein a gear ratio of the worm gear to the worm is equal to or less than 50:1.

3. The system of claim 1, wherein a lead angle of the worm is equal to or greater than 5 degrees.

4. The system of claim 1, wherein the worm gear and worm are configured to allow back drive.

5. The system of claim 1, wherein the first longitudinal axis and the second longitudinal axis extend substantially perpendicular to one another.

6. A rotational inerter system comprising:
a first shaft having a first longitudinal axis;
a first gear operatively connected to the first shaft, the first shaft and the first gear being rotatable about the first longitudinal axis;
a second shaft having a second longitudinal axis;
a second gear operatively connected to the second shaft, the second gear being in meshing engagement with the first gear, and the second shaft and the second gear being rotatable about the second longitudinal axis; and
a flywheel operatively connected to the second shaft,
wherein rotation of the first shaft about the first longitudinal axis causes rotation of the second shaft and the flywheel about the second longitudinal axis,
wherein the first and second longitudinal axes stay in fixed relation to one another during rotation of the first shaft,
and wherein during the rotation of the first shaft, a torque is applied at the first shaft, the torque being proportional to a rate of change of an angular velocity of the first shaft about the first longitudinal axis, wherein the second shaft rotates at a faster angular velocity than the first shaft.

7. The system of claim 6, including a clutch, the clutch configured to connect the flywheel to the second shaft during rotation in one direction only such that the force applied to the first shaft is only proportional to the increase in angular velocity in a single direction of the first shaft.

8. The system of claim 6, wherein a frictional force is applied to the rotation of the second shaft, the frictional force being at least one of a passive force and an active force.

9. The system of claim 8, wherein the frictional force is applied via a fluid in contact with the flywheel.

10. A vehicle system having a rotational inerter, the system comprising:
a first vehicle component and a second vehicle component, the first vehicle component configured to rotate relative to the second vehicle component;
an inerter comprising:
a first shaft having a first longitudinal axis, the first shaft being operatively connected to the first vehicle component;
a first gear operatively connected to the first shaft, the first shaft and the first gear being rotatable about the first longitudinal axis;
a second shaft having a second longitudinal axis, the second shaft being operatively connected to the second vehicle component;
a second gear operatively connected to the second shaft, the second gear being in meshing engagement with the first gear, and the second shaft and the second gear being rotatable about the second longitudinal axis; and
a flywheel operatively connected to the second shaft,
wherein rotation of the first vehicle component causes rotation of the first shaft about the first longitudinal axis,
wherein rotation of the first shaft causes rotation of the second shaft and the flywheel about the second longitudinal axis,
wherein the first and second longitudinal axes stay in fixed relation to one another during rotation of the first shaft,
wherein during rotation of the first shaft a torque is applied at the first shaft, the torque being proportional to a rate of change of an angular velocity of the first shaft about the first longitudinal axis, and wherein the first gear is a worm gear and the second gear is a worm.

11. The system of claim 10, wherein the first longitudinal axis and the second longitudinal axis extend substantially perpendicular to one another.

12. The system of claim 11, wherein the first vehicle component is a sway bar in a vehicle suspension system, and the first shaft is a center portion of the sway bar.

13. The system of claim 12, wherein the second shaft is operatively connected to the vehicle structure with a support bearing and a reaction link, the reaction link allowing the second shaft to move such that the worm stays in meshing engagement during movement of the sway bar within one or more sway bar supports.

14. The system of claim 10, wherein a gear ratio of the worm gear to worm is equal to or less than 50:1, and a lead angle of the worm is equal to or greater than 5 degrees.

15. The system of claim 10, wherein the first vehicle component is a steering axis for a motorcycle and the second vehicle component is a front portion of the motorcycle.

16. The system of claim 10, wherein the first vehicle component is a steering column and the first shaft is rotated upon rotational input from a vehicle steering wheel.

17. The system of claim 10, wherein the first vehicle component is a trailing arm suspension pivot and the second vehicle component is a trailing arm.

18. The system of claim 10, wherein the first vehicle component is a vehicle door hinge and the second vehicle component is a vehicle door.

19. The system of claim 18, wherein the vehicle door hinge is a trunk hinge and the vehicle door is a trunk lid.

20. A vehicle suspension system, the system comprising:
a sway bar operatively connected to two individual wheel components, the sway bar having a center portion having a first longitudinal axis;
a sway bar support operatively connected to the sway bar and a first vehicle structure, the sway bar rotatable about the first longitudinal axis within the sway bar support;
a worm gear operatively connected to the center portion of the sway bar, the worm gear being rotatable about the first longitudinal axis;
a shaft having a second longitudinal axis, the shaft being operatively connected to a second vehicle structure;
a worm operatively connected to the second shaft, the worm being in meshing engagement with the worm gear, and the second shaft and the worm being rotatable about the second longitudinal axis; and
a flywheel operatively connected to the second shaft, wherein rotation of the sway bar causes rotation of the worm gear about the first longitudinal axis, wherein rotation of the worm gear causes rotation of the second shaft and the flywheel about the second longitudinal axis at a faster angular velocity than that of the sway bar, wherein the first and second longitudinal axes stay in fixed relation to one another during rotation of the sway bar, and wherein during rotation of the sway bar a torque is applied at the sway bar, the torque being proportional to a rate of change of the angular velocity of the sway bar about the first longitudinal axis.

* * * * *